(12) United States Patent
Kim

(10) Patent No.: US 7,063,119 B1
(45) Date of Patent: Jun. 20, 2006

(54) LAMINATOR WITH SMALL FILM ROLL

(75) Inventor: Yang-Pioung Kim, Seoul (KR)

(73) Assignee: GMP Co., Ltd., Paju-si (KR)

( * ) Notice: Subject to any disclaimer, the term of this patent is extended or adjusted under 35 U.S.C. 154(b) by 0 days.

(21) Appl. No.: 11/075,371

(22) Filed: Mar. 8, 2005

(51) Int. Cl.
*B30B 15/00* (2006.01)

(52) U.S. Cl. ............... 156/555; 155/582; 155/583.1

(58) Field of Classification Search ............... 156/499, 156/555, 580, 582, 583.1; 100/327, 160, 100/176
See application file for complete search history.

(56) References Cited

U.S. PATENT DOCUMENTS

| 4,387,000 A | * | 6/1983 | Tancredi | 156/495 |
| 5,071,504 A | * | 12/1991 | Singer | 100/314 |
| 5,275,684 A | * | 1/1994 | Marazzi et al. | 156/359 |
| 5,584,962 A | * | 12/1996 | Bradshaw et al. | 156/495 |
| 5,873,965 A | * | 2/1999 | Greller | 156/64 |

* cited by examiner

*Primary Examiner*—James Sells
(74) *Attorney, Agent, or Firm*—Egbert Law Offices

(57) ABSTRACT

The laminator with a small film roll has a structure capable of having the small film roll mounted thereto, thus reducing costs required for laminating a target sheet, thereby solving problems occurring due to expensive costs. Furthermore, a feed tray is easily and removably installed, so that a process of mounting the small film roll to the laminator is simplified, thereby most users can easily use the laminator. Also, an upper heating roller of the laminator is able to be replaced by a roller having an embossing function. Therefore, the laminator of the present invention is able to texture the target sheet with various and graceful shapes.

1 Claim, 7 Drawing Sheets

LAMINATOR WITH SMALL FILM ROLL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to small laminators used in places such as offices and, more particularly, to a laminator with a small film roll which has a structure capable of having the small film roll mounted thereto, thus reducing costs required to laminate a target sheet, thereby solving problems occurring due to expensive costs, and in which a feed tray is easily and removably installed, so that a process of mounting the small film roll to the laminator is simplified, thereby most users can easily use the laminator.

BACKGROUND OF THE INVENTION

Generally, laminators are classified into large laminators, which are able to coat films on large photographs or advertisement papers, and pouch aminators, which are used in general offices and are able to laminate sheets of A3 size or less. The present invention relates to small laminators to be used in general offices.

Up to now, most small laminators used in general offices or homes are pouch laminators. In such a pouch laminator, the size of film used for laminating is standardized, for example, A4 or A3 size. Accordingly, a user must purchase standardized films and coat one film on a target sheet at a time.

As such, because conventional laminators have a structure in which a film roll is set in a laminator, the size and weight of the laminator are reduced. However, if a target sheet is larger than A3 size, it is impossible to laminate the target sheet. Furthermore, pouch film used in a pouch laminator is more expensive than roll film. Thus, the user is burdened with additional costs. As well, there is a problem of waste of film.

In addition, in conventional pouch laminators, there is no device for embossment of a target sheet. Therefore, the texture of the target sheet is limited, so that it is difficult to produce film-coated products having various and graceful shapes.

Moreover, in conventional laminators, because the pressure of rollers to compress a target sheet is constant, the number of defective products is increased. Thus, film waste is serious. Although a laminator has a structure capable of having the roller pressure adjusted, a separate compression adjusting handle is required and a user must manually manipulate the compression adjusting handle.

BRIEF SUMMARY OF THE INVENTION

Accordingly, the present invention has been made keeping in mind the above problems occurring in the prior art, and an object of the present invention is to provide a laminator with a small film roll which has a structure capable of mounting the small film roll thereto, thus reducing costs required for laminating a target sheet, thereby solving problems related to high costs, and in which a feed tray is easily and removably installed, so that a process of mounting the small film roll to the laminator is simplified, thereby most users can easily use the laminator, and which has a cutting unit at a rear portion of the laminator, so that a user can easily cut a film-coated sheet without a separate cutting tool.

Another object of the present invention is to provide a laminator with a small film roll which is able to emboss a target sheet merely by replacing an upper heating roller with a roller having an embossing function without an additional embossing work using expensive equipment, thus texturing the target sheet in various and graceful shape.

In order to accomplish the above object, the present invention provides a laminator with a small film roll, including: a pair of sidewalls provided at both sides of the laminator, each of the sidewalls of the laminator having upper and lower film roll supports provided on upper and lower portions of an inner surface of the sidewall, respectively, a plurality of slide slots formed at intermediate positions through the sidewall, and a stop protrusion provided at a predetermined position on the inner surface of the sidewall; and a drive unit provided on an outer surface of one of the sidewalls of the laminator, having a drive gear provided at a predetermined position on the outer surface of the sidewall and rotated by a drive motor, a first driven gear engaging with the drive gear and rotated by the rotation of the drive gear, upper and lower compression roller gears cooperating with the first driven gear and rotated by the rotation of the first driven gear, with a circular end plate provided on an end surface of each of the upper and lower compression roller gears such that the circular end plates of the upper and lower compression roller gears face each other, thus preventing the upper and lower compression roller gears from being removed, a second driven gear engaging with the lower compression roller gear and rotated along with the lower compression roller gear, and upper and lower heating roller gears cooperating with the second driven gear and rotated along with the second driven gear, with a circular end plate provided on an end surface of each of the upper and lower heating roller gears such that the circular end plates of the upper and lower heating roller gears face to each other, thus preventing the upper and lower heating roller gears from being removed. The laminator further includes a feed tray provided between the sidewalls of the laminator, having a coupling slot provided at a predetermined position on each of opposite sides of the feed tray in a longitudinal direction, so that the feed tray is coupled to a pair of coupling units by the coupling slots, and a stop notch provided at a predetermined position on each of the opposite sides of the feed tray such that the stop notch is hooked to the stop protrusion provided on the inner surface of each of the sidewalls of the laminator; and a pressure adjusting device provided on the outer surface of each of the sidewalls of the laminator, having a first link, a second link rotatably coupled at an end thereof to an end of the first link, a vertically movable link rotatably coupled to a predetermined position of the second link, a lower bracket coupled to an upper end of the vertically movable link, with a plurality of guide slots formed in a central portion of the lower bracket, and a first support plate provided in an upper end of the lower bracket. The pressure adjusting device further has an upper bracket coupled to a guide rod mounted to the lower bracket, with a spring fitted over the guide rod, and a second support plate provided on a lower end of the upper bracket.

BRIEF DESCRIPTION OF THE SEVERAL VIEWS OF THE DRAWINGS

The above and other objects, features and advantages of the present invention will be more clearly understood from the following detailed description taken in conjunction with the accompanying drawings.

DETAILED DESCRIPTION OF THE INVENTION

Hereinafter, a preferred embodiment of the present invention will be described in detail with reference to the accompanying drawings.

Figure 1:
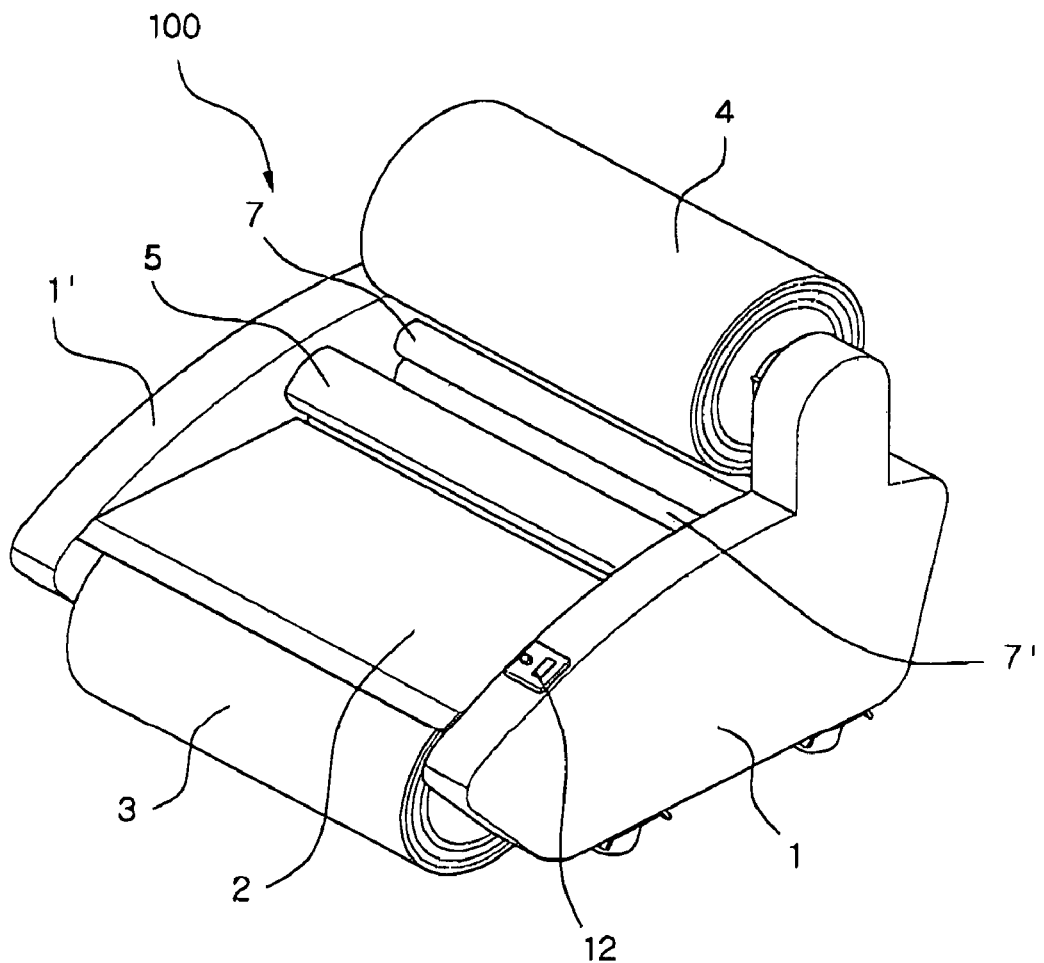
FIG. 1 is a perspective view of a laminator with a small film roll, according to an embodiment a present invention.
Figure 2:
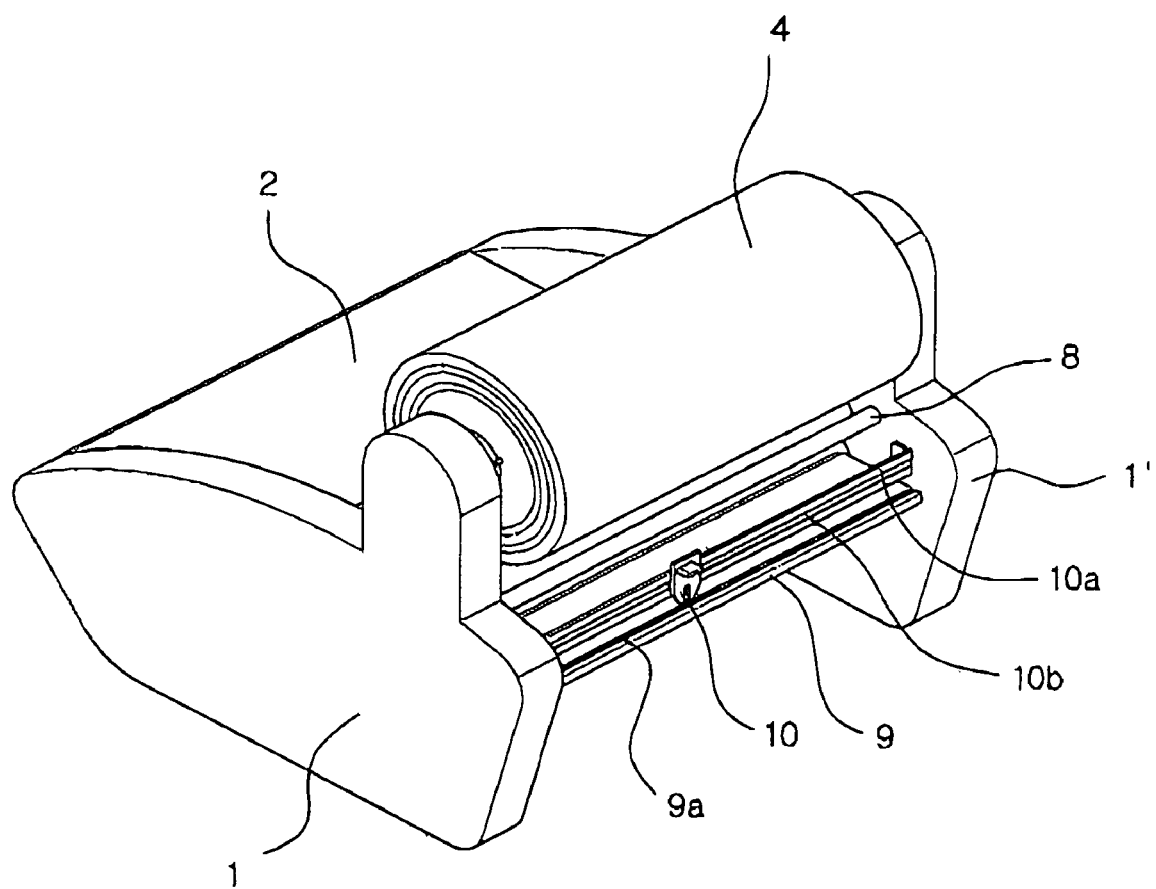
FIG. 2 is a perspective view showing a cutting unit of the laminator of FIG. 1.
Figure 3:
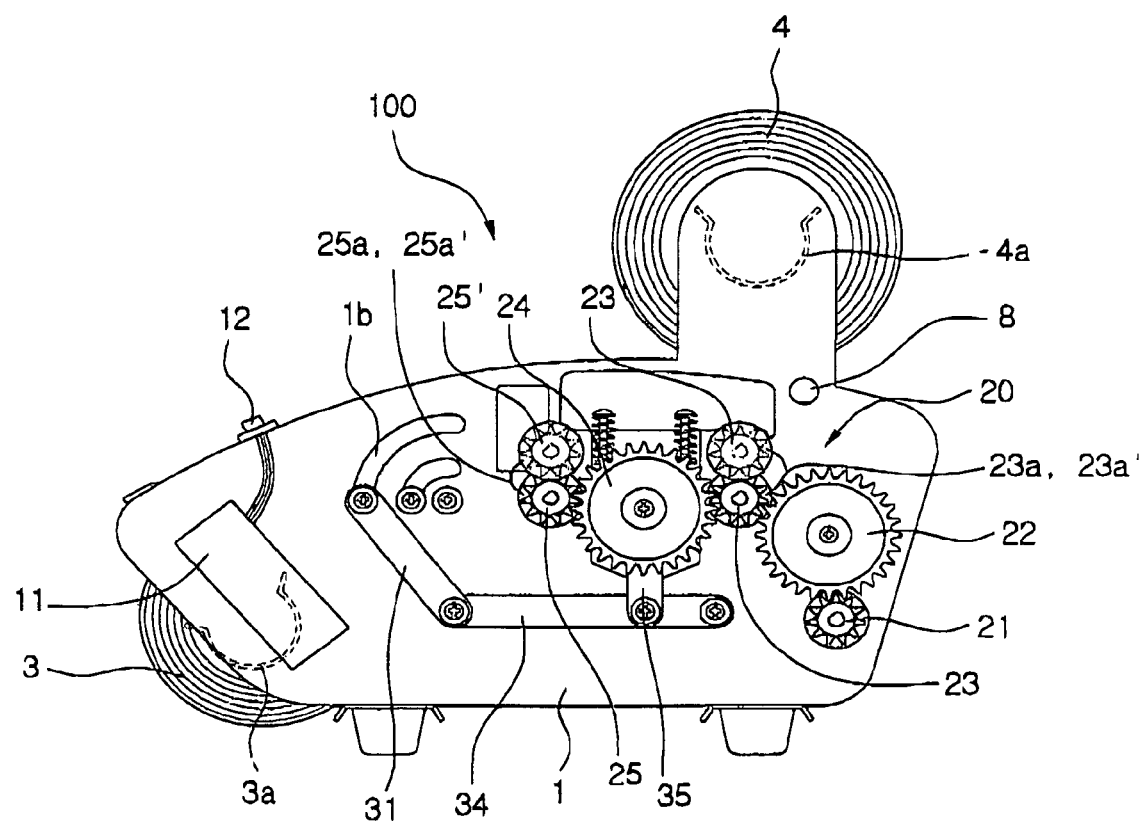
FIG. 3 is a side view showing the drive mechanism of the laminator of FIG. 1.
Figure 4A:
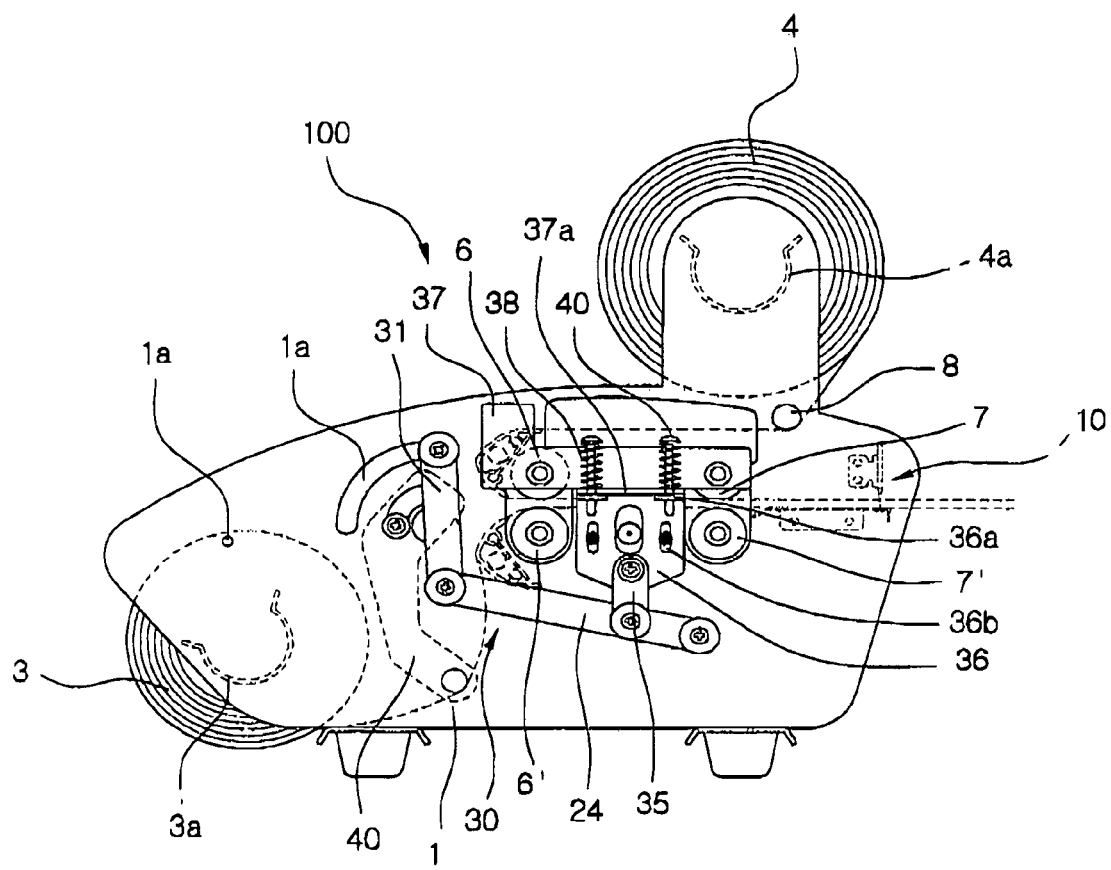
FIG. 4a is a side view showing the laminator of FIG. 1, which is ready for a laminating process.
Figure 4B:
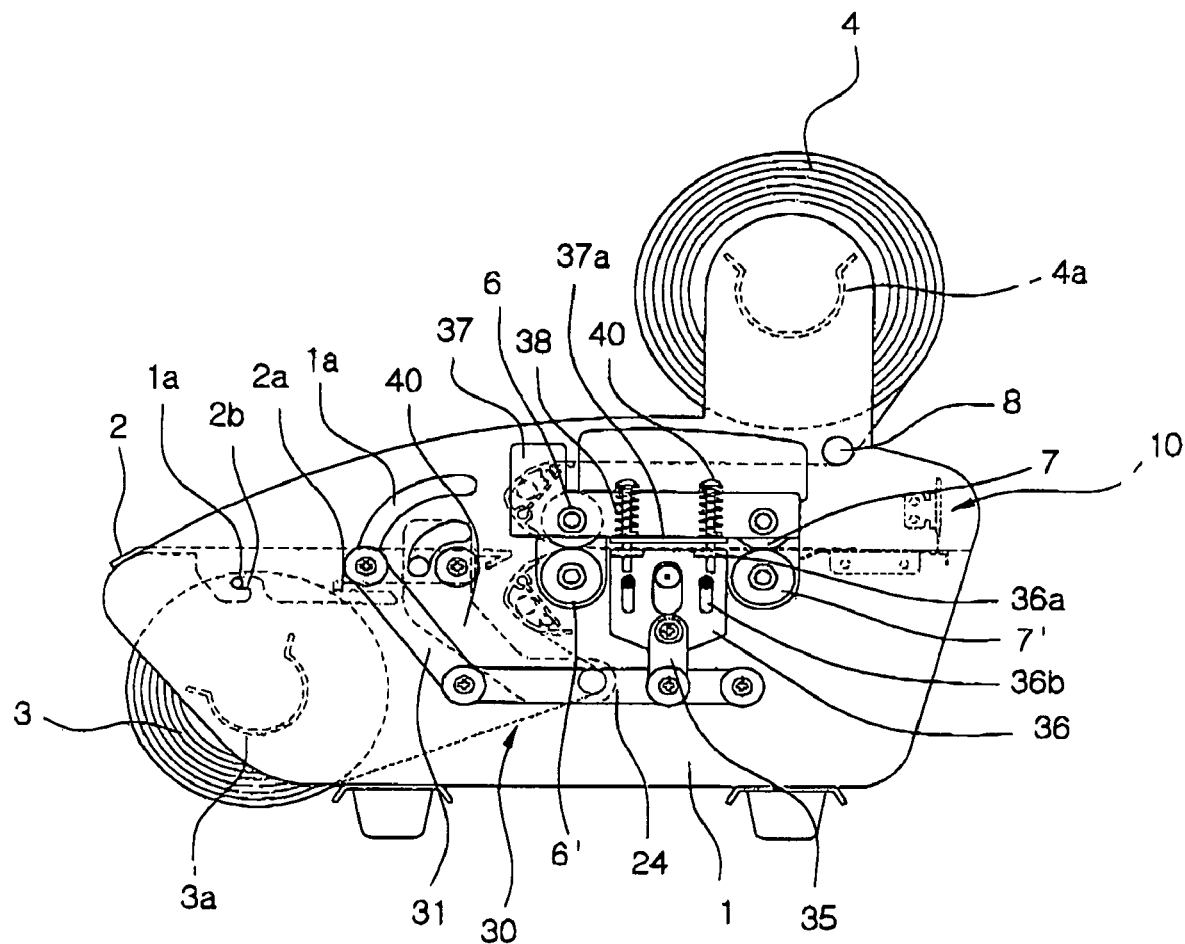
FIG. 4b is a side view showing the state of the laminator of FIG. 4a during a laminating process.
Figure 5:
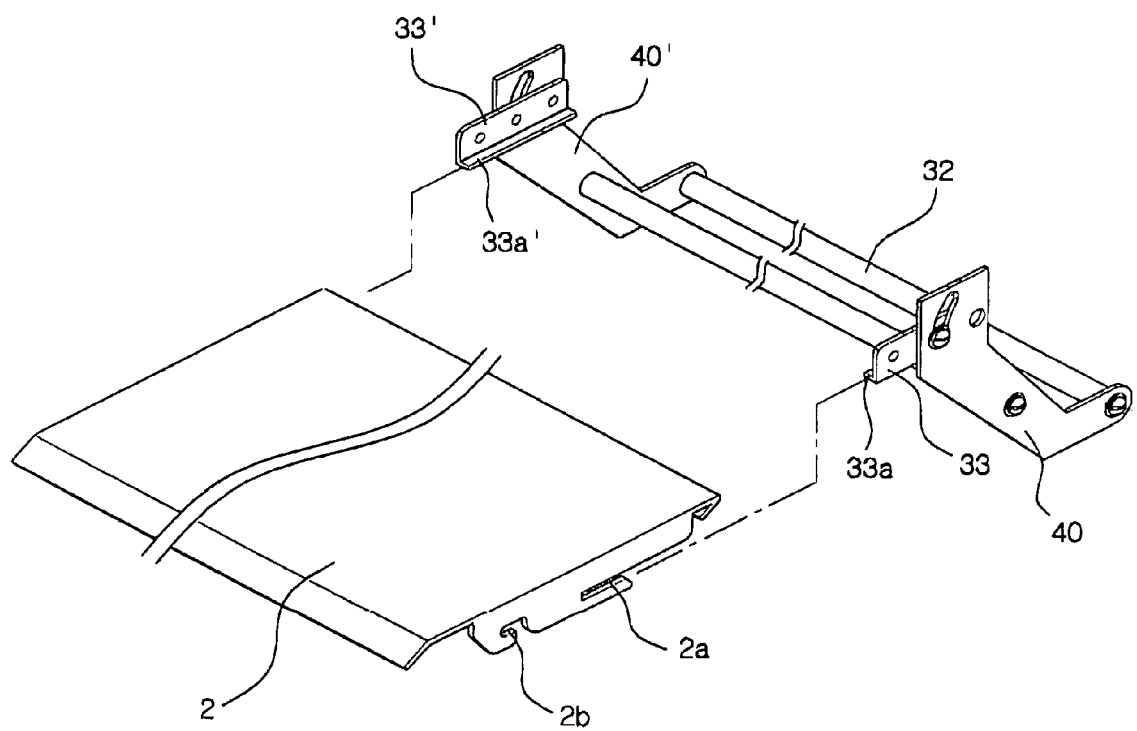
FIG. 5 is a perspective view showing a feed tray and rotating arms of the laminator of FIG. 1.

FIG. 1 is a perspective view of a laminator 100 with a small film roll, according to an embodiment of the present invention. FIG. 2 is a perspective view showing a cutting unit 10 of the laminator 100 of FIG. 1. FIG. 3 is a side view showing the drive mechanism of the laminator 100 of FIG. 1. FIG. 4a is a side view showing the laminator 100 of FIG. 1, which is ready for a laminating process. FIG. 4b is a side view showing a state of the laminator 100 of FIG. 4a during a laminating process. FIG. 5 is a perspective view showing a feed tray 2 and rotating arms 40 of the laminator 100 of FIG. 1.

As shown in FIG. 1, the laminator 100 according to the embodiment of the present invention includes opposite sidewalls 1 and 1' at both sides thereof, and a feed tray 2 which is provided between the sidewalls 1 and 1' of the laminator 100. A lower film roll 3 is supported between the sidewalls 1 and 1' below the feed tray 2. Preheating devices 5 and 5' are respectively provided around upper and lower heating rollers 6 and 6' behind the feed tray 2. Upper and lower compression rollers 7 and 7' are provided behind the upper and lower heating rollers 6 and 6'. A guide roller 8 is provided over the upper compression roller 7. An upper film roll 4 is supported between the sidewalls 1 and 1'of the laminator 100 over the guide roller 8.

Furthermore, an output plate 9 having a cutting groove 9a is provided below the lower compression roller 7'. The cutting unit 10, which moves along a guide bar 10a, in a latitudinal direction of the laminator 100, is provided over the output plate 9.

The upper and lower film rolls 4 and 3 are supported by upper and lower film roll supports 4a and 3a which have semicircular cross-sections and are respectively provided on upper and lower portions of inner surfaces of the sidewalls 1 and 1' of the laminator 100. A power switch 1 is provided on the sidewall 1 of the laminator 100 and is connected to a controller 11 which is installed in the sidewall 1.

FIG. 2 is a perspective view showing the cutting unit 10 of the laminator 100. As shown in FIG. 2, the output plate 9, on which the cutting groove 9a is formed in a longitudinal direction of the output plate 9, is provided at the rear portion of the laminator 100. The cutting unit 10 moves along the guide bar 10a which has a guide groove 10b and is provided over the output plate 9. An end of the cutting unit 10 is positioned in the cutting groove 9a of the output plate 9. Therefore, when a user moves the cutting unit 10 in a latitudinal direction of the laminator 100, a film-coated target sheet is cut.

FIG. 3 shows the drive mechanism of the laminator 100.

As shown in FIG. 3, the laminator 100 further includes a drive unit 20 which is provided on an outer surface of the sidewall 1 of the laminator 100. In the drive unit 20, a drive gear 21, which is provided at a predetermined position on the outer surface of the sidewall 1, is rotated by a drive motor (not shown) which is installed in the laminator 100. Then, a first driven gear 22, which engages with the drive gear 21, is rotated by the rotation of the drive gear 21. Thus, upper and lower compression roller gears 23 and 23', which cooperate with the first driven gear 22, are rotated by the rotation of the first driven gear 22. As a result, the upper and lower compression rollers 7 and 7' rotate along with the upper and lower compression roller gears 23 and 23'.

Furthermore, the lower compression roller gear 23' engages with a second driven gear 24. Upper and lower heating roller gears 25 and 25' cooperate with the second driven gear 24 and are rotated along with the second driven gear 24, which is rotated by the rotation of the lower compression roller gear 23'. A pair of first circular end plates 23a and 23a' are integrally provided on end surfaces of the upper and lower compression roller gears 23 and 23' such that the first circular end plates 23a and 23a' face each other, thus preventing the upper and lower compression roller gears 23 and 23' from being undesirably removed from the laminator 100. Similarly, a pair of second circular end plates 25a and 25a' are integrally provided on end surfaces of the upper and lower heating roller gears 25 and 25' such that the circular end plates 25a and 25a' face each other, thus preventing the upper and lower heating roller gears 25 and 25' from being undesirably removed from the laminator 100.

The operation of the laminator 100 of the present invention having the above-mentioned structure will be explained herein below with reference to FIGS. 4a and 4b. FIG. 4a shows of the laminator 100 which is ready for a laminating process. As shown in FIG. 4a, the laminator 100 further includes a pressure adjusting device 30 which is provided on the outer surface of each of the sidewalls 1 and 1' of the laminator 100. When a first link 31 of the pressure adjusting device 30 rotates upwards, a pair of coupling units 33 and 33', which are coupled to the first links 31, rotate in a predetermined direction. Then, a pair of rotating arms 40 and 40', which are coupled to the coupling units 33 and 33', rotates along with the coupling units 33 and 33'. As a result, a film support shaft 32, which is provided between the rotating arms 40 and 40' in a lateral direction, moves downwards, thus providing a space to install the upper and lower film rolls 4 and 3 in the laminator 100. Thereafter, the upper film roll 4 is set between the upper film roll supports 4a provided at the upper portion of the sidewalls 1 and 1' of the laminator 100. An end of the film extracted from the upper film roll 4 is supplied between the upper and lower heating rollers 6 and 6' via the guide roller 8, which is provided below the upper film roll 4, and the upper preheating device 5 such that the film is in close contact with an outer surface of the upper preheating device 5. Furthermore, the lower film roll 3 is set between the lower film roll supports 3a provided at the lower portion of the laminator 100. An end of the film extracted from the lower film roll 3 is supplied between the upper and lower heating rollers 6 and 6' via the film support shaft 32 and the lower preheating device 5' such that the film is in close contact with an outer surface of the lower preheating device 5'. Then, the laminator 100 is ready for a process at coating the films on upper and lower surfaces of a target sheet.

In this state, because paper tubes of the film rolls 3 and 4 are forcibly fitted over the film roll supports 3a and 4a, the film rolls 3 and 4 are forcibly rotated around the film roll supports 3a and 4a. Therefore, the films extracted from the film rolls 3 and 4 become tense when supplied to the rollers.

As such, when ready for the laminating process, the feed tray 2 is coupled to the coupling units 33 and 33' provided between the sidewall 1 and 1' of the laminator 100 such that coupling slots 2a of the feed tray 2 are fitted over coupling rails 33a and 33a' of the coupling unit 33 and 33'. As shown in FIG. 4b, the user rotates the feed tray 2 downwards at 90° angle until stop notches 2b of the feed tray 2 are hooked to stop protrusions 1a and 1a' provided at predetermined positions on the inner surface of the sidewall 1 and 1' of the laminator 100. Simultaneously, the first link 31, which is coupled to each coupling unit 33, 33' through a slide slot 1b which has an arc shape and is formed through each sidewall 1, 1', rotates downwards along with the coupling units 33 and 33'.

The first link 31 is rotatably coupled at a lower end thereof to an end of a second link 34. Therefore, when the first link 31 moves downwards, the second link 34 also moves downwards. Then, a vertically movable link 35, which is coupled to a predetermined position of the second link 34 moves downwards.

In addition, a lower bracket 36, which is coupled to an upper end of the vertically movable link 34, is moved downwards by the movement of the vertical movable link 34. Thus, a support plate 37a of an upper bracket 37, which is coupled to a support plate 36a of the lower bracket 36 by a guide rod 39 and a spring 38 fitted over the guide rod 39, moves downwards. As a result, both the upper heating roller 6 and the upper compression roller 7, which are provided at both ends of the upper bracket 37, move downwards. Simultaneously, the upper heating and compression rollers 6 and 7 can powerfully compress the target sheet due to the elasticity of the spring 38.

In the meantime, when the rotating arms 40 are rotated downwards by the rotation of the coupling units 33 and 33', the film support shaft 32 mounted to the lower ends of the rotating arms 40 moves rearwards. As a result, the lower film, which has sagged below the film supporting shaft 32, becomes tense due to the film supporting shaft 62.

In the above-stated in which the rollers are compressed, the upper and lower films are first coated on a target sheet by the upper and lower heating rollers 6 and 6'. Continuously, the target sheet is reliably coated while passing through the upper and lower compression rollers 7 and 7'. As such, the film-coated target sheet is placed on the output plate 9 provided at the rear part of the laminator 100. Then, the user cuts the film-coated target sheet using the cutting unit 10 provided on the output plate 9. A plurality of film-coated sheets can be obtained by continuously executing this process.

Figure 6:
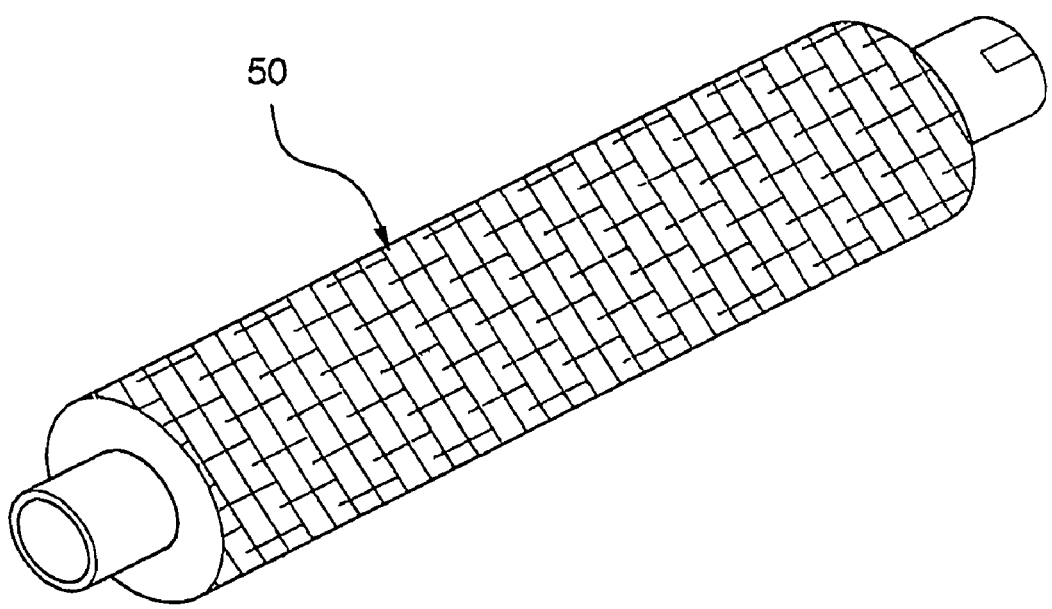
FIG. 6 is a perspective view showing a roller having embossments on the laminator according to the present invention.

In the present invention, the upper heating roller 6 may be able to be replaced with a roller 50 having an embossing function, as shown in FIG. 6. Therefore, as required, the user replaces the upper heating roller 6 with the embossing roller 50, thus texturing a target sheet with various and graceful shapes.

A process of manufacturing the embossing roller 50 is as follows. First, a film having various figures or patterns is manufactured. Thereafter, an acid-resistant sensitizer is applied to an outer surface of an embossing roller body. The film having figures or patterns is adhered to the outer surface of the embossing roller body. An appropriate amount of light irradiates the embossing roller body before the film having figures or patterns is removed from the embossing roller body. After a developing solution is applied to the embossing roller body, the embossing roller body is immersed in a chemical for etching. Thereafter, the embossing roller body rotates in the etching chemical to apply the chemical to the outer surface of the embossing roller body. Then, the outer surface of the embossing roller body is evenly etched, thus producing an embossing roller 50.

The technical content regarding the preheating device 5 was described in detail in Korean Utility Model registration No. 0254657, which was filed by the inventor of the present invention. Therefore, in this specification, further explanation is omitted.

As described above, the present invention provides a laminator with a small film roll which has a structure capable of having the small film roll mounted thereto, thus reducing costs required for laminating a target sheet, thereby solving problems occurring due to expensive costs, and in which a feed tray is easily and removably installed, so that a process of mounting the small film roll to the laminator is simplified. As well, despite a simple film roll installation process, the film extracted from the film roll is sufficiently tense without an additional film tensioning means. Thereby most users can easily use the laminator.

Furthermore, because the film extracted from the film roll is automatically tense due to the film support shaft, the number of defective film-coated products is minimized. In addition, because the laminator of the present invention has a cutting unit at a rear portion thereof, a user can easily cut a film-coated sheet.

Moreover, a heating roller is able to be replaced by a roller having an embossing function. Therefore, as required, a target sheet may be easily embossed.

As well, the present invention has a structure in which the rollers are automatically compressed by installation of the feed tray. Therefore, an additional compression device is unnecessary. Thus, the present invention solves a problem occurring because the user does not mistakenly manipulate a compression adjusting handle of the additional compression device during a film setting process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:
1. An apparatus comprising:
   a laminator having upper and lower heating rollers and upper and lower compression rollers and a pair of preheaters provided around said upper and lower heating rollers, said laminator having a small film roller;

a pair of sidewalls provided at opposite sides of said laminator, each of said pair of sidewalls having an inner surface, each of said pair of sidewalls comprising:
  upper and lower film roll supports provided on respective upper and lower portions of the inner surface of the sidewall;
  a plurality of slide slots formed at intermediate positions through the sidewall; and
  a stop protrusion provided at a predetermined position on the inner surface of the sidewall;
a drive unit provided on the outer surface of one of said pair of sidewalls of said laminator, said drive unit comprising:
  a drive gear provided at a predetermined position on the outer surface of the sidewall and rotated by a drive motor;
  a first driven gear engaging with said drive gear and rotated by a rotation of said drive gear;
  upper and lower compression roller gears cooperating with the first driven gear and rotated by the rotation of said first driven gear, an end surface of each of the upper and lower compression roller gears having a circular end plate thereon such that the circular end plates of the upper and lower compression roller gears face each other so as to prevent said upper and lower compression roller gears from being removed;
  a second driven gear engaging with the lower compression roller gear and rotated along with the lower compression roller gear; and
  upper and lower heating roller gears cooperating with said second driven gear and rotated along with said second driven gear, an end surface of each of said upper and lower heating roller gears having a circular end plate thereon such that the circular end plates of the upper and lower heating roller gears face each other so as to prevent said upper and lower heating roller gears from being removed;
a feed tray provided between said pair of sidewalls, said feed tray comprising:
  a coupling slot provided at a predetermined position on each of opposite sides of said feed tray in a longitudinal direction such that said feed tray is coupled to a pair of coupling units; and
  a stop notch provided at a predetermined position on each of said opposite sides of said feed tray such that the stop notch is hooked to said stop protrusion on the inner surface of each of said pair of sidewalls;
a pressure adjusting device provided on said outer surface of each of said pair of sidewalls, said pressure adjusting device comprising:
  a first link;
  a second link rotatably coupled at an end thereof to an end of said first link;
  a vertically movable link rotatably coupled to a predetermined position of said second link;
  a lower bracket coupled to an upper end of said vertically movable link, said lower bracket having a plurality of guide slots formed in a central portion thereof, said lower bracket having a first support plate provided on an upper end thereof; and
  an upper bracket coupled to a guide rod mounted to said lower bracket, said guide rod having a spring fitted thereover, said upper bracket having a second support plate provided on a lower end thereof; and
a pair of rotating arms coupled to said pair of coupling units, said pair of rotating arms having a film support shaft provided therebetween such that when said first link is rotated along the slide slots of said pair of sidewalls the coupling units are rotated such that said pair of rotating arms are rotated so as to move said film support shaft in a predetermined direction.

* * * * *